United States Patent
Ikematsu et al.

(10) Patent No.: US 6,759,498 B2
(45) Date of Patent: Jul. 6, 2004

(54) PROCESS FOR PRODUCING STYRENE RESIN REDUCED IN CONTENT OF LOW-MOLECULAR INGREDIENT

(75) Inventors: Takeshi Ikematsu, Musashino (JP); Kiyoshi Kawakami, Yokohama (JP); Hironori Suezawa, Yokohama (JP); Hiroshi Shirai, Kurashiki (JP)

(73) Assignee: Asahi Kadei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/275,328

(22) PCT Filed: May 2, 2001

(86) PCT No.: PCT/JP01/03804
§ 371 (c)(1),
(2), (4) Date: Nov. 8, 2002

(87) PCT Pub. No.: WO01/85802
PCT Pub. Date: Nov. 15, 2001

(65) Prior Publication Data
US 2003/0181610 A1 Sep. 25, 2003

(30) Foreign Application Priority Data

May 8, 2000 (JP) ........................ 2000-134356
May 12, 2000 (JP) ........................ 2000-139656
Aug. 16, 2000 (JP) ........................ 2000-246878

(51) Int. Cl.$^7$ ............................ C08F 12/08; C08F 2/06
(52) U.S. Cl. ........................... 526/346; 526/65; 526/88; 526/173
(58) Field of Search ............................ 526/65, 88, 173, 526/346

(56) References Cited

U.S. PATENT DOCUMENTS

| | | | |
|---|---|---|---|
| 3,954,894 A | 5/1976 | Kamienski et al. | |
| 4,016,348 A | 4/1977 | Adams | |
| 4,200,713 A | 4/1980 | Wingler et al. | |
| 4,205,016 A | 5/1980 | Tung et al. | |
| 4,748,222 A | 5/1988 | Malanga | |
| 4,859,748 A | 8/1989 | Priddy et al. | |
| 4,883,846 A | 11/1989 | Moore et al. | |
| 5,089,572 A | 2/1992 | Marchand et al. | |
| 5,391,655 A | 2/1995 | Brandstetter et al. | |
| 5,783,646 A | 7/1998 | Kihara et al. | |
| 6,429,273 B1 | 8/2002 | Ebara | |
| 6,495,648 B1 * | 12/2002 | Inagaki et al. | 526/347 |

FOREIGN PATENT DOCUMENTS

| | | |
|---|---|---|
| JP | 4-218512 A | 8/1992 |
| JP | 6-80712 A | 3/1994 |
| JP | 10-110074 A | 4/1998 |
| JP | 2000-143725 A | 5/2000 |
| WO | WO 97/33923 A1 | 9/1997 |
| WO | WO 00/15678 * | 3/2000 |

* cited by examiner

Primary Examiner—Fred Teskin
(74) Attorney, Agent, or Firm—Birch, Stewart, Kolasch & Birch, LLP

(57) ABSTRACT

A process for producing a styrenic resin with a small content of low molecular weight components, comprising a continuous anionic polymerization process wherein a raw material system having the following composition (A) is continuously fed, either collectively or in a divided manner, from one end of a reactor tank R1 having a back mixing flow and the product system is continuously discharged from the other end of the reactor tank R1, the internal temperature of the reactor tank R1 being controlled to a range of 40–120° C., the average proportion of styrene monomers to the sum total of the styrene monomers, hydrocarbon solvent and styrenic polymers present in the reactor tank R1 being controlled to less than 10 wt. %, and the resulting styrenic polymer solution being devolatilized and dried:

(A)

| | |
|---|---|
| Styrene monomer | 1.0 kg |
| Hydrocarbon solvent | 0.1–3 kg |
| Organolithium compound | 0.5–200 mmoles. |

26 Claims, No Drawings

PROCESS FOR PRODUCING STYRENE RESIN REDUCED IN CONTENT OF LOW-MOLECULAR INGREDIENT

This application is the national phase under 35 U.S.C. §371 of PCT International Application No. PCT/JP01/03804 which has an International filing date of May 2, 2001, which designated the United States of America.

TECHNICAL FIELD

The present invention relates to a process for efficiently producing a styrenic resin with a small content of styrenic low molecular weight components such as styrenic oligomers, etc., styrene monomers, remaining hydrocarbon solvent, etc., which is superior in processability and heat stability. The resulting styrenic resin can advantageously used for various applications, for example, as molding materials, for example, electric appliance materials, sundries materials, food container materials, food packaging or wrapping materials, etc., particularly as food container materials and food packaging or wrapping materials.

BACKGROUND ART

Styrenic resins have many distinguished physical characteristics such as lightweight properties, high rigidity, high water resistance, high electrical resistance, etc. They also have good moldability or processability, so that moldings in various shapes can be produced easily and on a mass-production scale. On the basis of these characteristics, styrenic resin have been used in a large amount for various applications such as electric appliance materials, sundries materials, food containers, food packaging or wrapping materials, etc.

Generally, styrenic resins can be produced by two types of methods in terms of reaction mechanism, i.e. a thermal radical polymerization process on the one hand, and a radical polymerization process using an initiator on the other. There are also two types of production processes, i.e. bulk polymerization process and suspension polymerization process, between which the bulk polymerization process is now predominant because of a smaller inclusion of impurities such as a dispersant, etc., and because of cost-wise advantages.

In the radical polymerization process, however, it is well known that oligomer formation generally takes place at the same time as resin production and also that styrene monomers tend to remain in the resin.

For example, according to Kirk-othmer's Encyclopedia of Chemical Technology, Third Edition, Vol. 21, page 817 (John Wiley)), thermal styrene polymerization at 100° C. or higher takes place together with the by-production of oligomers such as styrene dimer, styrene trimer, etc., amounting to about 1 wt. %. It is reported that specific oligomer components are mainly composed of 1-phenyl-4-(1'-phenylethyl)tetralin and 1,2-diphenyl-1-butene, and additionally include 2,4-diphenyl-1-butene and 2,4,6-triphenyl-1-hexene.

The bulk polymerization process is usually carried out at 80°–180° C. and then the resulting polymers are recovered by removing the remaining solvent and unreacted monomers therefrom by volatization with heating. However, in the radical polymerization process, high conversion of monomer to polymer cannot be achieved, and even after devolatilization with heating, a relatively large amount of unreacted styrene monomers usually remains in the resulting styrenic resin. Steps for improving the devolatilization with heating, for example, a method of azeotropic removal of the remaining styrene monomers together with water by adding water to the residue from the devolatilization with heating, mixing thereof and re-devolatilization, have been developed, but have not reached a satisfactory level yet.

Furthermore, since it is difficult to evaporate the by-produced styrene oligomers such as dimers, trimers, etc., most of the oligomers usually remain in the polymers.

Analysis of styrenic resins thus-produced detects the residues and impurities originating from the raw materials and the polymerization by-products. For example, styrene, α-methylstyrene, n-propylbenzene, isopropylbenzene, 2,4-diphenyl-1-butene, 1,2-diphenylcyclobutane, 1-phenyltetralin, 2,4,6-triphenyl-1-hexene, 1,3,5-triphenylcyclohexane, 1-phenyl-4-(1'-phenylethyl)tetralin, etc. are contained in the styrenic resin.

In this manner, styrenic resin produced by the now widely utilized radical polymerization processes contains a large amount of low molecular weight components comprising styrene monomers and styrenic oligomers, etc. due to the production process. Furthermore, the styrenic resin produced by the radical polymerization process is usually poor in stability, so that the content of low molecular weight components such as styrene monomers and styrenic oligomers, etc. in the resin is liable to increase, depending on the mechanical or thermal history during molding or processing. Low molecular weight components newly formed during the molding or processing cause the same problems as those of the low molecular weight components formed during the polymerization. For example, when used as electric appliance materials, sundries materials, food packaging or wrapping materials or food container materials, the low molecular weight components contained in the resin can cause various problems.

Specifically, the styrenic resin containing a large amount of such low molecular weight components does not have enough thermal stability during the molding or processing and is poor in heat resistance, which is typically expressed as hot rigidity, etc. Still further, in some cases a problem that oily matters deposit on the surfaces of molds or moldings during the molding or processing occurs. The low molecular weight components contained in the resin diffuse or ooze from the inside to the surface of moldings, creating problems, for example, the printing ink will not adhere to the surface or the print is liable to peel off. Still further, when they are applied to food containers or food packaging or wrapping, the low molecular weight components contained in the resin sometimes dissolve out or volatilize. The reduction of such problems has been keenly desired.

In contrast to the radical polymerization process, a process for producing styrenic resins by anionic polymerization, using an organolithium compound, etc. has also been technically known for a long time.

For example, its detail is disclosed in U.S. Pat. Nos. 5,391,655, 5,089,572, 4,883,846, 4,748,222, 4,205,016, 4,200,713, 4,016,348, 3,954,894, 4,859,748, etc.

In summary, these US Patents are limited only to a method of lowering the degree of dispersion in the anionic polymerization process (U.S. Pat. No. 4,883,846), a method relating to an apparatus, for example, a method employing a continuous polymerization system in the production of polystyrene by anionic polymerization (U.S. Pat. Nos. 4,016,348, 4,748,222 and 5,391,655), a method for producing an initiator for use in the anionic polymerization system and its application modes (U.S. Pat. Nos. 4,205,106 and 5,089,572). U.S. Pat. No. 4,859,748 discloses a method of controlling the anionic polymerization reaction of styrene in a continuous stirring bath-type reactor. However, these anionic polymerization process techniques for producing styrenic resins have made no mention at all of styrenic low molecular weight components relating to the object of the present invention.

Still further, JP-A-10-110074 discloses production of polymers with a small content of oligomers in the anionic polymerization using an organolithium compound as an initiator. Reference Example 2 therein discloses that monodispersed polymers with a narrow molecular weight distribution were obtained by a batch polymerization process of styrene monomer using an organolithium compound, and that styrene polymers with a dimer content of 1 ppm and a trimer content of 170 ppm were obtained by drying after addition of an antioxidant thereto. It further discloses that the styrene polymers thus-obtained by the anionic polymerization can be used for food packaging or wrapping materials, etc.

"Shokuhin Eisei (Food Hygiene)", vol. 39, No. 3, page 199 (1998) reports that styrene dimer and styrene trimer are dissolved out of polystyrene products for foodstuffs.

International Patent Application PCT/JP 97/00796 relates to, a process for producing vinylic polymers, an initiator for anionic polymerization of vinylic monomers and a styrenic resin composition. It discloses in the specification that, when the resulting styrenic polymers with a styrene trimer content of not more than 250 ppm is used as a food packaging or wrapping material, the migration of the styrene trimer into food, etc. is substantially negligible.

JP-A-2000-143725 relates to styrenic polymers produced by anionic polymerization and a process for producing the same and discloses styrenic polymers with a styrene dimer content of not more than 80 ppm and a styrene trimer content of not more than 800 ppm, a process for producing the same and the utilization in the foodstuff field.

As mentioned above, the following items (a)–(c) have been already known.

(a) Styrenic polymers can be obtained by anionic polymerization, using an organolithium compound.

(b) Styrenic polymers obtained by anionic polymerization using an organolithium compound, have lower styrene dimer and trimer contents than the styrenic polymers obtained by radical polymerization.

(c) Styrenic polymers obtained by using an organolithium compound can be utilized for various applications as resin materials, particularly for food packaging or wrapping materials and food container materials.

However, styrenic resins obtained by anionic polymerization still have several problems and have not been widely utilized yet for various applications as styrenic resin materials. That is, they suffer from the following problems (d)–(f).

(d) Styrenic resins obtained by anionic polymerization, using an organolithium compound is higher in production cost than the styrenic resins obtained by bulk radical polymerization.

(e) When the anionic polymerization is carried out at an elevated temperature and at a higher monomer concentration in order to improve the productivity and reduce the production cost, production of the styrenic low molecular weight components, particularly the dimer and trimer, are increased, so that one of the distinguished features of the anionically polymerized styrenic resins will be lost.

(f) Styrenic resins obtained by anionic polymerization, using an organolithium compound, generally have a narrow molecular weight distribution and a poor processability.

The foregoing problems of the prior art will be described in detail below:

One reason for the higher production cost mentioned in the foregoing item (d) is the poor productivity of the anionic polymerization process. In the bulk radical polymerization process, polymerization is carried out at a monomer concentration of 90 wt. % or higher, whereas in the anionic polymerization process, particularly batch anionic polymerization process, the monomer concentration is usually limited to less than about 25 wt. %. This is mainly due to difficulty in removal of the heat of polymerization in the anionic polymerization process. Production at a lower monomer concentration leads to a poor productivity.

That is, in the anionic polymerization process, using an organolithium compound, appreciable deactivation of the initiator takes place at temperatures higher than 120° C. Thus, to sufficiently complete the reaction, the polymerization temperature must be kept at 120° C. or lower by the removal of heat. The polymerization rate and the viscosity of polymerization solution are, however, considerably increased at a higher monomer concentration. Thus, the quantity and rate of heat generation are increased, while the heat removing capacity is decreased, resulting in difficulty in temperature control.

This problem can be solved in a laboratory-scale reactor by conducting effective heat removal. In a large scale plant-sized reactor vessel with a relatively low heat transfer area, the problem is still serious, making the batch polymerization at a higher monomer concentration very difficult to conduct.

In order to solve such a problem, there is an idea of lowering the monomer concentration to absorb the heat of polymerization by the latent heat in the temperature increase in the polymerization system. However, the monomer concentration is automatically limited also in that case and to control the temperature in the batch polymerization process the monomer concentration is again limited to usually less than about 25 wt. %. Thus, in the anionic polymerization process the lower monomer concentration is a principal cause for the poor productivity and higher production cost.

As an attempt to thoroughly solve the problem with heat removal in the high-concentration polymerization, a process for continuous polymerization, using a special reactor with a high heat removal efficiency has been proposed. For example, U.S. Pat. No. 4,859,748 discloses a process for anionic polymerization by continuously feeding styrene monomers at a high concentration of 30–80 wt. % through a tubular, circulation-type reactor with a large surface area and high heat removal efficiency.

In the process, anionic polymerization can be carried out at a high monomer concentration but there is still one problem. That is, the flow of the highly viscous polymer solution through a narrow tube proceeds without stirring. Such an unstirred polymerization in the tubular reactor gives rise to, depending on conditions, gel formation and ultimately a blockage of the tubular reactor, which is a fatal drawback.

The foregoing item (e) concerns a problem of styrenic low molecular weight components, particularly dimers and trimers. Unlike the radical polymerization process it has been stated that the anionic polymerization process is generally free from the by-production of styrene dimers and trimers.

However, as a result of extensive studies, the present inventors have found that even in the anionic polymerization process, using an organolithium compound, quite a large amount of the dimer and the trimer is formed under practical conditions, polymerization temperatures and monomer concentrations. The inventors have also found that styrenic low molecular weight components peculiar to the anionic polymerization process other than the styrene dimer and trimer are also formed. Such components are mainly formed by the reactions between the styrene monomers and a very small amount of impurities contained in a specific solvent in the presence of an organolithium compound, and have the structures that are no longer considered as styrene oligomers.

That is, as a result of the studies, the present inventors have found that even the anionic polymerization process also suffers from such a problem that an unnegligible amount of styrenic low molecular weight components having the molecular weights of 140–400 are contained in the resulting styrenic resin.

Poor processability of styrenic resin produced by the anionic polymerization process as mentioned in the foregoing item (f) is mainly due to a narrow molecular weight distribution. The molecular weight distribution of polymers obtained by a batch polymerization process or by a continuous polymerization process, using the tubular reactor, is generally very narrow. For example, the aforementioned JP-A-10-110074 shows in its Reference Example 2 that monodispersed polymers having a narrow molecular weight distribution (Mw/Mn=1.04) were obtained by a styrene monomer batch polymerization process using an organolithium compound. The polymers having a narrow molecular weight distribution are poor in the moldability and processability and usually are not preferable.

As an attempt to broaden the molecular weight distribution a method of adding a coupling agent thereto after the completion of the polymerization to attain polydispersion is a well known technique. That is, the molecular weight distribution is broadened in a polydispersed manner by producing polymers of rather low molecular weights by polymerization in advance, followed by coupling thereof to partially increase the molecular weights.

However, a large amount of an organolithium initiator is correspondingly required for the production of the polymers of low molecular weights by polymerization in advance of the coupling. It also requires a step after polymerization. That is, the method increases the amount of the catalyst to be used and involves complicated production steps, and thus results in a problem of increased production cost.

Furthermore, a multi-functional, e.g. at least tri-functional, coupling agent is required for satisfactory broadening of molecular weight distribution. Polymers polydispersed in this manner have long chains of a branched structure, showing a peculiar flow property, and thus usually are not preferable with respect to the sheet extrudability and foaming characteristics, and also have problems with moldability and processability.

As another attempt to broaden the molecular weight distribution, a technique of divided feeding of a polymerization initiator or addition of an alcohol, etc. to partially deactivate the initiator is also well known.

In the case of divided feeding, e.g. feeding divided into two stages, of the polymerization initiator, the molecular weight distribution can be, as a result, broadened as a blend composition consisting of polymers with high molecular weights and those with low molecular weights. In the case of partial deactivation of the initiator by a deactivating agent in the course of polymerization, similar effects can be obtained.

However, even the above technique still has several problems. For example, the resulting polymers will be in a resin composition containing a large amount of low molecular weight components. Such a resin composition has such problems as poor dynamic properties and heat resistance. In addition, the control of molecular weights or molecular weight distribution, is difficult and there are problems with complicated process steps and thus low productivity, etc.

The problem to be solved by the present invention is to provide a process for producing, at a high production efficiency, a styrenic resin with improved resin processability, processing stability and dynamic properties, a small content of low molecular weight components and thus, a much reduced dissolving-out or devolatilization of the low molecular weight components.

That is, in the process for producing a styrenic resin, using an organolithium compound, and also in the styrenic resin with a small content of low molecular weight components, the present invention solves the following problems (g)–(j) at the same time:

(g) To attain a continuous polymerization process with a high productivity, (h) To improve the processability of styrenic resin by broadening the molecular weight distribution, (i) To reduce the content of styrene monomers contained in the resulting styrenic resin, and (j) To reduce the content of styrenic low molecular weight components having molecular weights of 140–400 contained in the resulting styrenic resin.

SUMMARY OF THE INVENTION

The present invention is as recited in the appended claims.

That is, the present invention firstly provides a process for producing a styrenic resin with a small content of low molecular weight components, which comprises a continuous anionic polymerization process wherein a raw material system having the following composition (A) is continuously fed, either collectively or in a divided manner, from one end of a reactor tank R1 having a back mixing flow and the product system is continuously discharged from the other end of the reactor tank R1, the inside temperature of the reactor tank R1 being controlled to a range of 40°–120° C., and the average proportion of styrene monomer to the sum total of the styrene monomers, hydrocarbon solvent and styrenic polymers present in the reactor tank R1 being controlled to less than 10 wt. %, and the resulting styrenic polymer solution being devolatilized and dried:

| (A) | |
|---|---|
| Styrene monomer | 1.0 kg |
| Hydrocarbon solvent | 0.1–3 kg |
| Organolithium compound | 0.5–200 mmoles. |

The present invention secondly provides a styrenic resin with a small content of low molecular weight components having the following characteristics (B):

(B)

the weight average molecular weight of the styrenic polymers being in a range of 50,000–1,000,000;

the molecular weight distribution (Mw/Mn) of the styrenic polymers being in a range of 1.5–5.0;

the content of styrenic low molecular weight components having molecular weights of 140–400 contained in the styrenic resin being less than 1,000 ppm;

wherein the styrenic low molecular weight components comprise styrenic oligomer components and non-styrenic oligomer components and the content of the non-styrenic oligomer components thereof is less than 500 ppm.

BEST MODE FOR CARRYING OUT THE INVENTION

In the present process for producing a styrenic resin with a small content of low molecular weight components, the styrenic resin is produced by an anionic polymerization process, using an organolithium initiator.

The anionic polymerization process is limited to a continuous polymerization process. It is, therefore, limited to a process for producing a styrenic resin, comprising a continuous polymerization process wherein a raw material system is fed, either collectively or in a divided manner, from one end of a reactor tank R1 having a back mixing flow and the product system is discharged from another end of the reactor tank R1.

In the present process for producing a styrenic resin with a small content of low molecular weight components, polymerization can be carried out by a polymerization process using a single reactor tank R1 or by an integrated polymerization process using a reactor tank R1 and one reactor tank R2 or more reactor tanks connected to the former in series. The reactor tank R1 must have a back mixing flow as a mixing state. The term "back mixing flow" means mixing of a portion of the raw material system fed into the reactor tank in the reversed direction to the flow. The most preferable reactor tank with a back mixing flow is a reactor tank having a perfect mixing flow.

The most preferable integrated polymerization process is an integrated polymerization process wherein a continuous reactor tank R1 with substantially perfect mixing flow and then a continuous reactor tank R2 with plug flow are connected to each other in series. A reactor tank having a back mixing flow or a reactor tank having a perfect mixing flow can hardly attain a high conversion rate efficiently, because of the mixing characteristics. It is also preferable to connect one or more other reactor tanks thereto in series.

The term "back mixing flow" is not limited to its narrow meaning. That is, it may mean such a mixing state that the initiator can have a broader retention time distribution, so that the molecular weight distribution of the polymers can be considerably broadened. Specifically, it means such a mixing state that the molecular weight distribution of the resulting polymers, i.e. the ratio of weight average molecular weight to number average molecular weight, Mw/Mn, is 1.5 or more.

A preferable mixing state is such that the weight average molecular weight of polymers in solution at various positions in the reactor tank R1 is distributed in a range of 0.7–1.3 times, preferably 0.8–1.2 times, and particularly preferably 0.9–1.1 times as large as the weight average molecular weight of the polymers in the whole reactor tank. The narrower distribution means that there is no deviation in the molecular weights of the polymers present at various positions of the reactor tank, meaning that the content of the tank is homogenized under stirring.

In the reactor tank having a back mixing flow or perfect mixing flow, the molecular weight distribution of the polymers can be broadened, and in the successive reactor tank having a plug flow, the remaining unreacted monomers can be efficiently converted. Broadening of the molecular weight distribution assists in improving the processability of the resin and complete conversion of the monomers can reduce the contents of monomer and the low molecular weight components originating from the monomer that contaminate the resin after devolatilization and drying. The conversion rate of the monomer in the polymerization step should be controlled to preferably 99.90% or more, more preferably 99.99% or more, and particularly preferably 99.995% or more.

In the present process for producing a styrenic resin with a small content of low molecular weight components, the average monomer concentration in the reactor tank R1 must be controlled to be less than 10 wt. %. That is, the proportion of styrenic monomers to the sum total of the styrenic monomers, hydrocarbon solvent and styrenic polymers must be controlled to be less than 10 wt. %, preferably less than 5 wt. %, more preferably 3 wt. % and particularly preferably less than 2 wt. %

That is, in spite of the fact that the concentration of fed styrenic monomers is not less than 25 wt. %, polymerization must be carried out while controlling the monomer concentration in the polymerization system to be less than 10 wt. %, and the remaining 15 wt. % or more of the monomer co-exists in the solution as polymers. In the stable continuous polymerization process, this value is always kept unvariable.

In the batch polymerization process, on the other hand, the monomer concentration corresponds, as a matter of course, to the fed composition at the initial reaction stage and will be decreased with time. In the continuous polymerization process in a plug flow type reactor tank without any back mixing flow, the monomer concentration corresponds to the fed composition at the feeding position and will be decreased by movement toward the discharging position. That is, the substantial monomer concentration in the polymerization system is close to that in the fed composition.

In the present process for producing a styrenic resin with a small content of low molecular weight components, the concentration of monomer present in the reactor tank R1 depends basically on the feeding rate and the fed composition of the raw material system and the polymerization rate in the reactor tank, though it also depends on the mixing state. The concentration of monomers present in the reactor tank with a perfect mixing flow can be reduced, e.g. by controlling the monomer feeding rate in accordance with the polymerization rate.

Since the anionic polymerization rate is proportional to the first power of the monomer concentration, the side reaction in proportion to the second or third power of the monomer concentration can be suppressed to a very low level by decreasing the substantial monomer concentration in the polymerization system. The formation rates of oligomers such as styrene dimer, styrene trimer, etc. can be considerably decreased by controlling the monomer concentration, probably because they are in proportion to the multi-power of the monomer concentration.

In the present process for producing a styrenic resin with a small content of low molecular weight components, an organolithium compound is used as a polymerization initiator. Organolithium compounds are so-called organometallic compounds of lithium having a carbon-lithium bond. More specifically, for example, alkyllithium compounds, alkyl-substituted phenyllithium compounds, etc. are included. Preferable alkyllithium compounds include, for example, ethyllithium, n-propyllithium, n-butyllithium, sec-butyllithium, tert-butyllithium, benzyllithium, etc.

The amount of organolithium initiator to be used depends on the molecular weight of the desired polymer. That is, the molecular weight of the polymer is basically determined by the composition ratio of the monomers to the organolithium initiator. The amount of the organolithium compound used per kg of the monomer is in a range of 0.5–200 mmoles, preferably 1–100 mmoles, and particularly preferably 2–20 mmoles.

If the amount of the organolithium compound is smaller than the above range, the polymerization rate will be lowered, the molecular weights of the resulting polymers will be considerably increased, or the like, and thus it is not preferred. If the amount of the organolithium compound is larger than the above range, the production cost will be increased, the molecular weights of the resulting polymers will be extremely lowered, etc., and, thus, it is not preferred.

In the polymerization using the organolithium compound as a polymerization initiator, one molecule of polymer is basically formed by one molecule of the initiator, and thus the amount of the organolithium compound to be used depends on the molecular weight of the desired polymer. However, it is known that the active sites can be shifted by adding an appropriate amount of hydrocarbons having an active hydrogen thereto, thereby improving the efficiency of the initiator to a certain degree. Hydrocarbons with an active hydrogen for use for this purpose are, e.g. hydrocarbon compounds with a hydrogen atom bonded to the carbon atom at the α position with respect to the phenyl group or aryl group. Preferable examples include, for example, toluene, ethylbenzene, xylene, tetralin, propylene, etc.

In the present process for producing a styrenic resin with a small content of low molecular weight components, the main component of monomer to be used is styrene. However, it may contain other copolymerizable monomers than styrene. Examples thereof include, for example, vinylic aromatic hydrocarbons other than styrene, conjugated dienes, methacrylate esters, etc. These copolymerizable monomers may be useful for adjusting the heat resistance, softening temperature, impact resistance, rigidity, processability, etc. of the resin.

The present process for producing a styrenic resin with a small content of low molecular weight components may be a solvent-free bulk polymerization process. A solution polymerization is, however, generally preferable from the viewpoint of easy stirring and heat removal due to reduced viscosity.

Solvent for use in the polymerization is basically a hydrocarbon solvent inert to the organolithium initiator, capable of dissolving monomers and produced polymer and being kept in a liquid state during the polymerization and easy to be removed by evaporation in the solvent removal step after the polymerization. It includes, for example, alicyclic hydrocarbon solvents of C5–C9 and aromatic hydrocarbon solvents of C6–C9. Particularly preferable are alicyclic hydrocarbon solvents of C5–C9. Specifically, for example, cyclohexane, methylcyclohexane, methylcyclopentane, cyclohexene, and mixtures thereof are included.

Examples of aromatic hydrocarbon solvents of of the present invention. C6–C9 include, for example, benzene, toluene, ethylbenzene, xylene, tetralin, etc. These aromatic hydrocarbon solvents other than benzene are the hydrocarbon compounds wherein a hydrogen atom is bonded to the carbon atoms at the α position with respect to the phenyl group, and thus have an active hydrogen. When such a hydrocarbon solvent with an active hydrogen is used in a large amount, the active site keeps on shifting during the polymerization to increase the amount of non-styrenic oligomer components. This is not preferable for the purpose of the present invention.

It is not objectionable that the solvents partially contain aliphatic hydrocarbons without any cyclic structure. Further, mixing with an etheral compound or a tertiary amine compound can improve the polymerization activity of the organolithium compound on the monomers.

The amount of the polymerization solvent to be used is in a range of 0.1–3 kg per kg of the monomers, preferably 0.5–2.0 kg, and particularly preferably 0.67–1.5 kg.

If the amount of the polymerization solvent is too small, heat removal and stirring will be difficult to perform, and thus it is not preferable. If the amount of polymerization solvent is too large, the amount of solvent to be removed after the polymerization will increase and subsequently the amount of thermal energy will increase, and thus it is not preferred.

Polymerization temperature is in a range of of the present invention. 40°–120° C., preferably 60°–110° C. and particularly preferably 70°–90° C. Extremely low polymerization temperature is not practical because of decreased reaction rate. On the other hand, extremely higher polymerization temperature is not preferable, either, because of an increased yield of styrenic low molecular weight components and also decreased reaction rate due to decomposition and deactivation of the initiator. Higher temperatures than 110° C. are not preferable, either, depending on uses, because the resulting resin would be colored in some cases.

In the present process for producing a styrenic resin with a small content of low molecular weight components, the viscosity of the solution is generally considerably higher during the polymerization, though it depends on the monomer concentration in the raw material system. Thus, removal of the heat of polymerization only with an ordinary jacket provided around the reactor tank is often difficult. Well known means are used to enhance the heat removal capacity of the reactor tank. It is preferable to use means such as a heat-removing coil provided within the reactor tank, an external circulating jacket in addition to the reactor tank jacket, a reflux condenser, etc.

The pressure inside the reactor tank must be a pressure sufficient to keep the polymerization system in a liquid phase. When the reflux condenser is used to remove the heat of the reaction, reduced pressure can be also applied, if necessary.

Basically, carbon-lithium bonds remain at the terminals of the polymers after the polymerization. Such bonds, if left to remain as they are, undergo air oxidation, thermal decomposition, etc. at the finishing stage, etc., resulting in decreased stability or coloring of the styrenic resin thus-produced. It is preferable to stabilize the active terminals, i.e., carbon-lithium bonds, of the polymers after the polymerization. It is preferable to add a compound having an oxygen-hydrogen bond such as water, alcohol, phenol, carboxylic acid, etc. thereto. Similar effects are expected from epoxy compounds, ester compounds, ketone compounds, carboxylic acid anhydrides, compounds having a carbon-halogen bond, etc. A preferable amount of such an additive to be used is approximately 1–10 equivalent weights on the basis of the carbon-lithium bond. An excessively larger amount is not only disadvantageous, in terms of cost, but also often causes problematic contamination by the remaining additive.

It is also possible to carry out coupling reaction with a polyfunctional compound on the carbon-lithium bonds to increase the polymer molecular weight and further to bring the polymer chains into a branched structure. The coupling agent for use in such a coupling reaction can be selected from the known coupling agents. The coupling agents include, for example, polyhalogen compounds, polyepoxy compounds, mono- or polycarboxylate esters, polyketone compounds, mono- or polycarboxylic acid anhydrides, alkoxy compounds of silicon or tin, etc. Specifically, they include, for example, silicon tetrachloride, di(trichlorosilyl) ethane, 1,3,5-tribromobenzene, epoxidized soybean oil, tetraglycidyl 1,3-bisaminomethylcyclohexane, dimethyl oxalate, tri-2-ethylhexyl trimellitate, pyromellitic acid dianhydride, diethyl carbonate, etc.

Alkali components originating from the organolithium, for example, lithium oxide or lithium hydroxide, can be neutralized and stabilized by addition of an acidic compound thereto. Such acidic compounds include, for example, carbon dioxide, boric acid, various carboxylic acid compounds, etc. Addition of the acidic compound, particularly, can sometimes improve white turbidness due to water absorption or coloring of the resulting styrenic resin.

Molecular weight of styrenic polymers contained in the present styrenic resin with a small content of low molecular weight components is, in terms of weight average molecular weight, generally in a range of 50,000–1,000,000, preferably 100,000–600,000, and particularly preferably 200,000–400,000. Excessively low weight average molecular weight is not preferable, because various dynamic properties, such as impact strength, hot rigidity, etc. will be lowered. On the other hand, excessively high weight average molecular weight is not preferable, either, because the moldability and processability of the resin will be lowered.

Molecular weight distribution defined by a ratio of weight average molecular weight to number average molecular weight (Mw/Mn) of styrenic polymers contained in the styrenic resin with a small content of low molecular weight components of the present invention is in a range of 1.5–5.0, preferably 2–4. Excessively narrow molecular weight distribution is not preferable, because the processability and specific resin properties such as impact strength and foaming characteristics will be lowered. On the other hand, excessively broad molecular weight distribution is not preferable, either, because specific resin properties such as flow characteristics during the molding, hot rigidity, etc. will be lowered.

In order to improve thermal or mechanical stability, antioxidation property, weather resistance and light resistance, the present styrenic resin with a small content of low molecular weight components may be admixed with the various stabilizers known for their utility with styrenic resins. They include, for example, phenolic stabilizers, phosphorus-based stabilizers, nitrogen-based stabilizers and sulfur-based stabilizers.

JP-A-7-292188 discloses that addition of 2,4,6-trisubstituted phenol is particularly advantageous as a method for stabilizing polystyrene. Preferable examples of 2,4,6-trisubstituted phenol include 2,6-di-t-butyl-4-methylphenol, triethyleneglycol-bis-[3-(3-t-butyl-5-methyl-4-hydroxyphenyl)propionate], pentaerythritol tetrakis [3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, n-octadecyl-3-(3,5-di-t-butyl-4-hydroxyphenyl)propionate, 2-t-butyl-6-(3-t-butyl-2-hydroxy-5-methylbenzyl)-4-methylphenyl acrylate, 2[1-(2-hydroxy-3,5-di-t-pentylphenyl)]-4,6-di-t-pentylphenyl acrylate, tetrakis [methylene-3-(3,5-di-t-butyl-4-hydroxyphenyl)propionate] methane, 3,9-bis[2-{3-(t-butyl-4-hydroxy-5-methylphenyl) propionyloxy}-1,1-dimethylethyl]-2,4,8,10-tetraoxa[5,5] undecane, 1,3,5-tris(3',5'-di-t-butyl-4'-hydroxybenzyl)-s-triazine-2,4,6(1H,2H,3H)-trione, 1,1,4-tris(2-methyl-4-hydroxy-5-t-butylphenyl)butane, 4,4'-butylidenebis(3-methyl-6-t-butylphenol), etc.

These stabilizers may be mixed with the resin after the resin is recovered. It is, however, particularly preferable from the viewpoint of easy mixing and suppression of the resin from deterioration during the solvent recovery step, to add the stabilizers after the polymerization when the resin is in a state of solution.

After the polymerization, unreacted monomer and the solvent can be removed and recovered from the polymer solution by evaporation. Well known methods can be used for the evaporative removal. Preferably, as evaporative removal apparatus, for example, a method of flushing in a vacuum tank and a method of evaporative removal from an outlet vent-port with an extruder, etc. can be used. Volatile components such as the solvent, unreacted remaining monomers, etc. are removed by evaporation generally at temperatures of 150°–300° C., preferably 180°–260° C. and a vacuum degree of preferably 0 to atmospheric pressure, more preferably 100 Pa –50 KPa. A method using a plurality of evaporative removal apparatus connected to one another in series is effective for high level evaporative removal. A method for enhancing the evaporation capacity in the second stage by adding water between the first stage and the second stage can be preferably employed.

The amount of styrenic low molecular weight components having a molecular weight of 140–400 contained in the present styrenic resin with a small content of low molecular weight components must be less than 1,000 ppm, and the amount of non-styrenic oligomer components must be less than 500 ppm. The amount of the styrenic low molecular weight component is preferably less than 600 ppm, more preferably less than 400 ppm and particularly preferably less than 200 ppm. The amount of non-styrenic oligomer components is preferably less than 300 ppm, more preferably less than 200 ppm and particularly preferably less than 100 ppm.

Styrenic low molecular weight components having a molecular weight of 140–400 contained in the present styrenic resin with a small content of low molecular weight components consist of styrenic oligomer components and non-styrenic oligomer components. Specifically, the styrenic oligomer components herein referred to mean dimers and trimers of styrene. Non-styrenic oligomer components mean low molecular weight components each having 1–3 phenyl groups and a molecular weight of 180–400, other than the styrenic oligomers.

Styrene dimers have the molecular weight of 208, and include, for example, 2,4-diphenyl-1-butene, cis-1,2-diphenylcyclobutane, trans-1,2-diphenylcyclobutane, etc. Trimers of styrene have the molecular weight of 312, and include, for example, 2,4,6-triphenyl-1-hexene, 1-phenyl-4-(1'-phenylethyl)tetralin (including 4 kinds of isomers), 1,3,5-triphenyl-cyclohexane, etc.

The non-styrenic oligomer components mean hydrocarbon compounds having 1–3 aromatic rings in the molecule. Specifically, hydrocarbon compounds having two aromatic rings include, for example, 1,3-diphenylpropane, 1,3-diphenylbutane, 2,4-diphenylpentane, etc. and hydrocarbon compounds having three aromatic rings include 1,3,5-triphenylpentane, 1,3,5-triphenyl hexane, 1,2,4-triphenylcyclopentane, etc.

These non-styrenic oligomer components are formed mainly by reaction, etc. of specific solvent or impurities contained therein with styrene monomers in the presence of an organolithium compound and have a structure which is no longer recognized as a styrenic oligomer structure. For example, 1,3-diphenylpropane or 1,3,5-triphenylpentane is formed by addition of one or two molecules of styrene to toluene. Further, 1,3-diphenylbutane or 1,3,5-triphenylhexane is formed by addition of one or two molecules of styrene to ethylbenzene.

Besides these, 1,2,4-triphenylcyclopentane, 2,4-diphenylpentane, 1,2-diphenylcyclopropane, etc. are also found in the styrenic resin after the devolatilizations with heating, as a result of decomposition of the styrenic resin, etc. though their formation mechanisms have not been clarified yet.

The amount of styrene monomers contained in the present styrenic resin with a small content of low molecular weight components is preferably less than 500 ppm, more preferably less than 200 ppm, particularly preferably less than 100 ppm, and most preferably less than 20 ppm.

The amount of remaining hydrocarbon solvent contained in the present styrenic resin with a small content of low molecular weight components is preferably less than 1,000 ppm, more preferably less than 300 ppm, and particularly preferably less than 100 ppm.

When the content of these low molecular weight components, i.e. styrene monomers, styrenic low molecular weight components and remaining hydrocarbon solvent is large, molding of styrenic resin and thermal stability during the processing will be unsatisfactory, and the heat resistance, expressed as hot rigidity, etc. will be deteriorated. The low molecular weight components contained in the resin will diffuse or ooze from the inside to the surface of moldings, so that printing ink not adhere thereto or the deposited print is liable to peel off. Furthermore, such problems that the low molecular weight components contained in the resin are dissolved out or volatilized are sometimes encountered. Particularly, when the amount of styrenic low molecular weight components is large, the problem that oily matters are deposited on the surfaces of the mold or moldings during the molding or processing, etc. may occur.

When the amount of styrene monomers is less than 20 ppm, that of styrenic low molecular weight components having molecular weights of 140–400 is less than 200 ppm and that of non-styrenic oligomer components is less than 100 ppm, diffusion or dissolving-out is substantially unobservable. These conditions are particularly preferable.

In the present process for producing a styrenic resin with a small content of low molecular weight components, the styrenic resin freed from volatile components such as solvent, etc. by devolatilization can be finished into a pellet form by a well known method.

The present styrenic resin with a small content of low molecular weight components can be admixed with a well known resin additive known for its use in the styrenic resin material field, if necessary. The resin additives include, for example, dyes, pigments, fillers, lubricants, mold release agents, plasticizers, antistatic agents, etc. If required, the present styrenic resin with a small content of low molecular weight components can be admixed with other known resins, as long as the characteristics of the styrenic resin are not lost. Preferable examples thereof include polystyrene or high impact polystyrene obtained by radical polymerization, polyphenylene ether, ABS, and styrene-conjugated diene block copolymers and their hydrogenated products.

The present styrenic resin with a small content of low molecular weight components can be molded by a known resin molding process. Specific resin molding processes include, for example, injection molding, compression molding, extrusion molding, blow molding, vacuum molding, etc. Foamed moldings can be also molded by combining the molding process with various expansion molding techniques.

The present styrenic resin with a small content of low molecular weight components is suitable for use in various known styrenic resin applications, for example, electric appliance materials, sundries materials, toy materials, foamed heat-insulating architecture materials, food container materials, food packaging materials, etc. The present styrenic resin is particularly suitable for food container and food packaging or wrapping applications where they are brought into direct contact with food, while making good use of a very small content of styrene monomers and styrenic low molecular weight components.

Specific examples of food containers and packages or wrapping include food containers such as lactic acid-based beverage containers, custard containers, jelly containers, such food containers as soybean sauce pitchers, etc., expansion-molded food trays, instant noodle cups, lunch boxes, beverage cups, etc., and food packages or wrappings such as sheet-formed vegetable wrappings, marine product wrappings, etc.

Embodiments of the present invention will be concretely described below, referring to Examples and Comparative Examples, which are, needless to say, only for illustrating the present invention, and not for limiting the scope of the present invention.

EXAMPLE 1

A reactor tank R1 of perfect mixing type having a capacity of 2 l, provided with a stirrer, and a reactor tank R2 of plug flow type having a capacity of 1 l, provided with a stirrer, were connected to each other in series, and the temperature of these two reactor tanks was controlled to 80° C.

A solution of the mixture of styrene monomers and cyclohexane as a polymerization solvent in a ratio of 50/50 by weight was fed into the reactor tank R1 at a flow rate of 1.78 kg/hr. Separately, a solution of n-butyllithium as an organolithium initiator in cyclohexane was fed into the same reactor tank in the amount corresponding to 8 mmoles per kg styrene monomers.

The reaction solution was discharged as an effluent from the reactor tank R1 and successively passed through the reactor tank R2 in a plug flow manner. The conversion rate of the monomers to resin at the time of discharge from the reactor tank R1 was 98% on average, and the conversion rate after the passage through the reactor tank R2 was 99.99% or higher.

The conditions inside the reactor tank R1 were investigated during the state where a continuous polymerization reaction is stationary. That is, small amounts of the solution were sampled from sampling outlets L1–L5 arranged at equal distances, from the upstream side toward the downstream side in the reactor tank R1 to analyze monomer concentrations and weight average molecular weights of the resin therefrom. Polymerization state is shown in Tables 1 and 2.

TABLE 1

| | Polymerization state | | | |
|---|---|---|---|---|
| | Reactor tank temp. (° C.) | Fed monomer concentration (wt. %) | Average monomer concentration in reactor tank R1 (wt. %) | Specific shift of weight average molecular weight |
| Ex. 1 | 80 | 50 | 0.9 | 0.97–1.01 |
| Ex. 2 | 100 | 60 | 0.4 | 0.95–1.02 |
| Ex. 3 | 80 | 50 | 0.6 | 0.96–1.02 |
| Ex. 4 | 80 | 50 | 0.8 | 0.94–1.02 |
| Ex. 5 | 81 and 80 | 50 | 1.0 | 0.95–1.02 |
| Comp. Ex. 1 | 122 | 50 | 1.5 | 0.91–1.03 |
| Comp. Ex. 2 | 80 | 50 | 11.6 | 0.67–1.00 |
| Comp. Ex. 3 | 50–133*[1] | 50 | 50–0 | No distribution |

TABLE 1-continued

| | Polymerization state | | | |
|---|---|---|---|---|
| | Reactor tank temp. (° C.) | Fed monomer concentration (wt. %) | Average monomer concentration in reactor tank R1 (wt. %) | Specific shift of weight average molecular weight |
| Comp. Ex. 4 | 130–160 | 90 | Gradually decreased from 90 | No distribution |

Note:
*1)Internal temperatures actually determined are shown only for Ex. 5 and Comp. Ex. 3, and set temperatures for the others.

TABLE 2

| | | Weight average molecular weight | |
|---|---|---|---|
| Sampling outlet | Monomer concentration (wt. %) | Weight average (×10$^4$) | Specific shift*2) |
| L1 | 0.94 | 24.5 | 0.97 |
| L2 | 0.91 | 25.0 | 1.00 |
| L3 | 0.90 | 25.2 | 1.00 |
| L4 | 0.86 | 25.3 | 1.01 |
| L5 | 0.85 | 25.3 | 1.01 |
| Average | 0.89 | 25.1 | — |

Note:
*2)Specific shift is a value of weight average molecular weight of each of the samples L1–L5, divided by the weight average molecular weight of effluent polymer from reactor tank R1.

The anion-active terminals of the resulting polymers were deactivated by adding a three-fold amount of methanol, on the basis of the organolithium compound, to the resulting polymer solution. Then, volatile components were removed from the polymer solution by heating in a depressurized flushing tank at 240° C. Furthermore, the remaining volatile components were removed from the resin by adding 0.5 wt. % of water to the resin, followed by mixing and passing through an extruder with a pressure reduction vent at 250° C.

Molecular weight distribution of the polymers in the resulting styrenic resin (defined by a ratio of weight average molecular weight to number average molecular weight, Mw/Mn), contents of styrene monomers, styrenic low molecular weight components and remaining hydrocarbon solvent (cyclohexane) were analyzed by gas chromatography. Results of the analysis are shown in Table 3.

TABLE 3

| | Styrenic resin characteristics | | | | | | Resin properties | | | | | | |
|---|---|---|---|---|---|---|---|---|---|---|---|---|---|
| | Molecular weight | | Low molecular weight component content of the resin (ppm) | | | | | | | Amount of components dissolved out from components dissolved | | | |
| | | | | Styrenic low molecular components | | Hydro- carbon | | Foam- ing | | | Styrenic low molecular weight components | | Hydro- carbon |
| | Weight average (×10$^4$) | Mw/Mn *3) | Mono- mer | Oligomer *4) | Others *5) | solvent *6) | Mold- ability | fouling property | charact- eristics | Mono- mer | Oligomer *4) | Others *5) | solvent *6) |
| Ex. 1 | 25.2 | 2.2 | 7 | 90 | 30 | 40 | ○ | ○ | ○ | ND | ND | ND | ND |
| Ex. 2 | 25.0 | 2.5 | 10 | 130 | 40 | 40 | ○ | ○ | ○ | ND | ND | ND | ND |
| Ex. 3 | 24.5 | 2.1 | 18 | 70 | 70 | 90 | ○ | ○ | ○ | ND | ND | ND | ND |
| Ex. 4 | 25.3 | 2.3 | [[90]] | 100 | 30 | 50 | ○ | ○ | ○ | ND | ND | ND | ND |
| Ex. 5 | 24.2 | 2.0 | 20 | 50 | 20 | 20 | ○ | ○ | ○ | ND | ND | ND | ND |
| Comp. Ex. 1 | 11.5 | 2.8 | 380 | 540 | 1800 | 110 | x | x | x | 8 | 3 | 40 | ND |
| Comp. Ex. 2 | 23.0 | 1.3 | 30 | 680 | 400 | 90 | x | x | Δ | ND | 5 | 3 | ND |
| Comp. Ex. 3 | 18.5 | 1.2 | 440 | 790 | 450 | 100 | x | x | x | 10 | 6 | 9 | ND |
| Comp. Ex. 4 | 26.3 | 3.2 | 300 | 8600 *7) | | 120 | Δ | x | Δ | 5 | 200 *7) | | ND |

Note
*3) Mw/Mn shows a ratio of weight average molecular weight to number average molecular weight.
*4) "Oligomer" herein means the sum total of dimers and trimers of styrene.
*5) "Others" herein means the sum total of styrenic low molecular weight components having molecular weights of 140–400 (hydrocarbon compounds having 1–3 aromatic rings in the molecule, formed through the resin production), other than the dimers and trimers of styrene.
*6) "Hydrocarbon solvent" herein referred to is mainly a polymerization solvent used in the production.
*7) Styrenic low molecular weight components of Comp. Ex. 4 are mainly oligomers, but show sum total of styrenic low molecular weight components, because the distinction between styrenic oligomers and other components was analytically difficult.
*8) The detectable limit, ND, in the determination of the amount of components dissolved out from resin means "non-detectable". The detectable limit for each component is: 1 ppb for monomer, 1 ppb for styrenic low molecular weight components and 10 ppb for hydrocarbon solvent.

EXAMPLE 2

The reaction was carried out in the same manner as in Example 1, except that the styrene monomers and cyclohexane as a polymerization solvent were used in a ratio of 60/40 by weight, and the temperature of the two reactor tanks was set to 100° C.

The average monomer concentration in the reactor tank R1 was 0.4 wt. %, and the specific shift in the weight average molecular weight at L1–L5 was in a range of 0.95–1.02.

EXAMPLE 3

The reaction was carried out in the same manner as in Example 1, except that ethylbenzene was used as a polymerization solvent. Average monomer concentration in reactor tank R1 was 0.6 wt. %, and the specific shift in the weight average molecular weight was in a range of 0.96–1.02.

EXAMPLE 4

The reaction was carried out in the same manner as in Example 1, except that only reactor tank R1 was used without using reactor tank R2 of plug flow type. Average monomer concentration in reactor tank R1 was 0.8 wt. % and the specific shift in the weight average molecular weight was in a range of 0.94–1.02.

EXAMPLE 5

A reactor tank R1 of perfect mixing type having an actual capacity of 2 l, provided with a reflux condenser and a stirrer, and a reactor tank R2 of plug flow type having a capacity of 1 l, provided with a stirrer, were connected to each other in series.

A solution mixture of styrene monomers and cyclohexane (containing 3 wt. % of n-hexane) as a polymerization solvent in a ratio of 50/50 by weight was fed into the reactor tank R1 at a flow rate of 1.78 kg/hr. Separately, a solution of n-butyllithium as an organolithium initiator in cyclohexane was fed into the same reactor tank in the amount corresponding to 8 mmoles per kg of the styrene monomers.

The pressure of reactor tank R1 was set to atmospheric pressure, and the heat generated during the polymerization was removed by refluxing the cyclohexane in the refluxing condenser. The reaction solution was substantially stabilized at 81° C. The temperature of reactor tank R2 was controlled to 80° C.

Average monomer concentration in the reactor tank R1 was 1.0 wt. %, and the specific shift in the weight average molecular weight was in a range of 0.95–1.02.

COMPARATIVE EXAMPLE 1

The reaction was carried out in the same manner as in Example 1, except that ethylbenzene was used as a polymerization solvent and that the temperatures of both reactor tanks were set to 122° C. Average monomer concentration in the reactor tank R1 was 1.5 wt. %, and the specific shift at L1–L5 was in a range of 0.91–1.03.

COMPARATIVE EXAMPLE 2

The reaction was carried out under the same conditions as in Example 1, except that the flow in the reactor tank R1 was set to a plug flow state by reducing the stirring rate of Example 1 and changing the shape of the stirring blade in Example 1. Average monomer concentration in the reactor tank R1 was 11.6 wt. %, and the specific shift in the weight average molecular weight was in a range of 0.67–1.00.

COMPARATIVE EXAMPLE 3

0.75 Kg of styrene monomers, 0.75 kg of ethylbenzene as a polymerization solution and 0.57 mmoles of n-butyllithium as an organolithium initiator were fed at the room temperature into a reactor having the capacity of 2 l, provided with a stirrer. Then, the temperature was gradually elevated with stirring, and elevated from about 50° C. finally to 133° C. by internal heat generation. Then the temperature was gradually lowered to 100° C., while continuing the reaction for 1.5 hours in total. Post-polymerization treatment was carried out under the same conditions as in Example 1.

Although there was no stationary state of reaction due to the batch polymerization, there was no shift in the monomer concentration distribution and the weight average molecular weight in the reactor tank. Thus, it is presumed that the polymer solution throughout the reactor tank was homogeneous.

COMPARATIVE EXAMPLE 4

1.35 Kg of styrene monomers and 0.15 kg of ethylbenzene as a polymerization solvent were fed into a reactor having the capacity of 2 l, provided with a stirrer, at the room temperature. Then, the temperature was gradually elevated with stirring and thermal radical polymerization was carried out at 130°–140° C. for 6 hours, and then the polymerization was continued at 160° C. for 2 hours. Post-polymerization treatment was carried out under the same conditions as in Example 1.

1) Evaluation of Moldability 1.2-mm Thick sheets were injection molded by using the styrenic resins produced as above, at the resin temperature of 240° C. and the mold temperature of 50° C.

Moldability was evaluated in terms of the state of flow mark occurrence on the molded sheets.

Evaluation criteria were as follows:

◯: No flow mark was observed at all.

Δ: Flow mark occurrence was slightly observed.

x : Flow mark occurrence was considerably observed.

2) Evaluation of Mold Fouling Property

The foregoing sheet molding was carried out for 500 shots, and then the mold surface was strongly wiped with gauze. The mold fouling property was evaluated in terms of the deposition state of oily matters on the gauze. The evaluation criteria were as follows.

◯: No deposition of oily matters was observed at all.

x : Slight deposition of oily matters was observed.

3) Foaming Characteristics

100 Parts by weight of each of the styrenic resins produced as above was admixed each with 0.1 parts by weight of talc, and then the mixtures were introduced into a first extruder and thermoplasticized at about 220° C., followed by addition of about 4 wt. % of butane under pressure to impregnate the butane into the mixtures. Then, the mixtures were fed into the second extruder and extruded through a die at about 130° C. after the control of the temperature thereof to have a suitable viscosity for foaming to form foamed sheets of styrenic resins.

After thorough aging of the sheets, the thickness and characteristics were measured for evaluation. Average thickness of foamed sheets of styrenic resins was about 2.5 mm. The evaluation criteria were as follows:

◯: Foams were even in size and isolated.

Δ: Foams were somewhat uneven in size and there are partly connected foams.

x : foams were uneven in size and there are a somewhat large proportion of partly connected foams.

4) Determination of the Amount of the Substances Dissolved Out 1.2 mm-thick sheets obtained by the aforementioned injection molding were cut into pieces. N-heptane was added to the pieces in an amount corresponding to 2 ml per cm² of the surface area of the cut pieces. The pieces were then immersed and dissolved out therein at 25° C. for one hour. The resulting solutions were transferred each into glass containers to be analyzed and evaluated as the solution containing the substances dissolved out from the sheet.

(1) A Method for the Analysis of Styrene Monomers and Hydrocarbon Solvent

The solutions obtained as above were quantitatively analysed by a gas chromatograph-mass spectrometer.

(2) A Method for the Analysis of Styrenic Low Molecular Weight Components 50 ml each of the solutions obtained as above was concentrated, and the volume of each was adjusted to 2 ml with hexane and quantitatively analyzed by a gas chromatograph-mass spectrometer.

Results of the Evaluation are Summarized in Table 3.

As is obvious from Table 1, in Examples 1 to 5, the average styrene monomer concentration in the reactor tank R1 of back mixing flow type was suppressed to less than 5 wt. %, though the fed monomer concentration was over 25 wt. %. Weight average molecular weight of polymers in the solution at various positions of the reactor tank was in a distribution range 0.7–1.3 times as large as the weight average molecular weight on the average throughout the reactor tank, showing that a controlled polymerization state with a distinguished homogeneity was established in a substantially perfect mixing flow.

As is obvious from Table 3, the content of styrenic low molecular weight components in the resulting styrenic resins of 1,000 ppm or less could be attained by keeping the above-mentioned operation conditions. The resulting resins have a superior balance between the processability, typically expressed as moldability, mold fouling property and foaming characteristics, and resin characteristics.

INDUSTRIAL UTILITY

Styrenic resin with a small content of low molecular weight components and a process for producing thereof according to the present invention provide styrenic resin having decreased contents of monomer and styrenic low molecular weight components and superior dynamic characteristics and processing stability, as well as a process for producing thereof.

The present invention can attain the following effects (g)–(f) together at the same time:

(g) To attain a continuous polymerization process with a high productivity, (h) To improve the processability of styrenic resin by broadening the molecular weight distribution, (i) To reduce the content of styrene monomers, and (j) To reduce the content of styrenic low molecular weight components having molecular weights of 140–400.

The present styrenic resin with a small content of low molecular weight components is superior in the dynamic characteristics and processing stability. In addition, heat stability is improved, and, thus, moldability and processability, perticularly foaming characteristics, can be improved, as represented by, for example the fact that the mold fouling by oily matters during the molding can be prevented. The amount of volatile components and components dissolved out from resin materials can be considerably reduced.

What is claimed is:

1. A process for producing a styrenic resin with a small content of low molecular weight components, comprising a continuous anionic polymerization process wherein a raw material system having the following composition (A) is continuously fed, either collectively or in a divided manner, from one end of a reactor tank R1 having a back mixing flow and the product system is continuously discharged from the other end of the reactor tank R1, the internal temperature of the reactor tank R1 being controlled to a range of 40° C.–120° C., the average proportion of styrene monomers to the sum total of the styrene monomers, hydrocarbon solvent and styrenic polymers present in the reactor tank R1 being controlled to less than 10 wt. %, and the resulting styrenic polymer solution being devolatilized and dried:

| (A) | |
|---|---|
| Styrene monomer | 1.0 kg |
| Hydrocarbon solvent | 0.1–3 kg |
| Organolithium compound | 0.5–200 mmoles. |

2. A process according to claim 1, wherein the raw material system has the following composition (A)':

| (A)' | |
|---|---|
| Styrene monomer | 1.0 kg |
| Hydrocarbon solvent | 0.5–2 kg |
| Organolithium compound | 0.5–200 mmoles. |

3. A process according to claim 1, wherein the resulting styrenic resin with a small content of low molecular weight components has the following characteristics (B):

(B)

the weight average molecular weight of styrenic polymers contained in the styrenic resin being in a range of 50,000–1,000,000;

the molecular weight distribution (Mw/Mn) of the styrenic polymers being in a range of 1.5–5.0;

the content of styrenic low molecular weight components having molecular weights of 140–400 contained in the styrenic resin being less than 1,000 ppm;

wherein the styrenic low molecular weight components comprise styrenic oligomer components and non-styrenic oligomer components and the content of the non-styrenic oligomer components thereof are less than 500 ppm.

4. A process according to claim 1, wherein the resulting styrenic resin with a small content of low molecular weight components has the following characteristics (B)':

(B)' the weight average molecular weight of the styrenic polymers contained in the styrenic resin being in a range of 100,000–600,000;

the molecular weight distribution (Mw/Mn) of the styrenic polymers being in a range of 2.0–4.0;

the content of styrenic low molecular weight components having molecular weights of 140–400 contained in the styrenic resin being less than 600 ppm;

wherein the styrenic low molecular weight components comprise styrenic oligomer components and non-styrenic oligomer components and the content of the non-styrenic oligomer components thereof are less than 300 ppm.

5. A process according to claim 2, wherein the resulting styrenic resin with a small content of low molecular weight components has the following characteristics (B):

(B)

the weight average molecular weight of the styrenic polymers contained in the styrenic resin being in a range of 50,000–1,000,000;

the molecular weight distribution (Mw/Mn) of the styrenic polymers being in a range of 1.5–5.0; and the content of styrenic low molecular weight components having molecular weights of 140–400 contained in the styrenic resin being less than 1,000 ppm;

wherein the styrenic low molecular weight components comprise styrenic oligomer components and non-styrenic oligomer components and the content of the non-styrenic oligomer components thereof are less than 500 ppm.

6. A process according to claim 2, wherein the resulting styrenic resin with a small content of low molecular weight components has the following characteristics (B)':

(B)' the weight average molecular weight of styrenic polymers contained in the styrenic resin being in a range of 100,000–600,000;

the molecular weight distribution (Mw/Mn) of the styrenic polymers being in a range of 2.0–4.0; and the content of styrenic low molecular weight components having molecular weights of 140–400 contained in the styrenic resin being less than 600 ppm;

wherein the styrenic low molecular weight components comprising styrenic oligomer components and non-styrenic oligomer components and the content of the non-styrenic oligomer components thereof are less than 300 ppm.

7. A process according to claim 1, wherein the average proportion of the monomers to the sum total of the styrene monomers, hydrocarbon solvent and styrenic polymers present in the reactor tank R1 is controlled to less than 5 wt. %.

8. A process according to claim 1, wherein the hydrocarbon solvent is an alicyclic compound having 5–8 carbon atoms.

9. A process according to claim 1, wherein the internal temperature of the reactor tank R1 is controlled to a range of 60°–110° C.

10. A process according to claim 1, wherein the internal temperature of the reactor tank R1 is controlled to a range of 70°–90° C.

11. A process according to claim 1, wherein polymerization is carried out by an integrated polymerization process, using one reactor tank R2 or more reactor tanks connected to the reactor tank R1 in series.

12. A process according to claim 1, wherein the weight average molecular weights of polymers in the solution at various positions in the reactor tank R1 are in a range of 0.7–1.3 times as large as the weight average molecular weight on average in the whole reactor tank, and the reactor tank R1 has substantially a perfect mixing flow and superior homogeneity.

13. A process according to claim 1, wherein the reactor tank R1 has a reflux condenser as an ancillary apparatus, through which the heat of polymerization is removed.

14. A styrenic resin with a small content of low molecular weight components having the following characteristics (B)':

(B)' the weight average molecular weight of styrenic polymers contained in the styrenic resin is in a range of 100,000–600,000;

the molecular weight distribution (Mw/Mn) of the styrenic polymers is in a range of 2.0–4.0; and the content of styrenic low molecular weight components having molecular weights of 140–400 contained in the styrenic resin is less than 600 ppm;

wherein the styrenic low molecular weight components comprise styrenic oligomer components and non-styrenic oligomer components and the content of the non-styrenic oligomer components are less than 300 ppm.

15. A styrenic resin according to claim 14, wherein the content of the styrenic low molecular weight components having molecular weights of 140–400 contained in the styrenic resin is less than 400 ppm and the content of the non-styrenic oligomer components thereof is less than 200 ppm.

16. A styrenic resin according to claim 14, wherein the content of the styrenic low molecular weight components having molecular weights of 140–400 contained in the styrenic resin is less than 200 ppm and the content of the non-styrenic oligomer components thereof is less than 100 ppm.

17. A styrenic resin according to claim 14, wherein the content of styrene monomers contained in the resin is less than 500 ppm.

18. A styrenic resin according claim 14, wherein the content of styrene monomers contained in the resin is less than 200 ppm.

19. A styrenic resin according to claim 14, wherein the content of styrene monomers contained in the resin is less than 100 ppm.

20. A styrenic resin according to claim 14, wherein the content of the remaining hydrocarbon solvent contained in the resin is less than 1,000 ppm.

21. A styrenic resin according to claim 14, wherein the content of the remaining hydrocarbon solvent contained in the resin is less than 300 ppm.

22. A styrenic resin according to claim 14, wherein the content of the remaining hydrocarbon solvent contained in the resin is less than 100 ppm.

23. A food packaging molded from a styrenic resin according to claim 14.

24. A food packaging expansion molded from a styrenic resin according to claim 14.

25. A food container molded from a styrenic resin according to claim 14.

26. A food container expansion molded from a styrenic resin according to claim 14.

* * * * *